(12) United States Patent
Djurkovic et al.

(10) Patent No.: US 6,430,168 B1
(45) Date of Patent: Aug. 6, 2002

(54) CDMA BASE STATION LANTERN APPLICATION

(75) Inventors: Roderick James Djurkovic, Allen; Farhad Bassirat, Plano, both of TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/420,326

(22) Filed: Oct. 18, 1999

(51) Int. Cl.[7] .............................................. H04B 7/00
(52) U.S. Cl. ..................... 370/331; 455/436; 455/444
(58) Field of Search ................................ 370/331, 332, 370/335, 342, 350; 455/436, 437, 438, 440, 442, 444

(56) References Cited

U.S. PATENT DOCUMENTS 6,091,955 A * 7/2000 Aalto ........................... 455/444
6,205,132 B1 * 3/2001 Hong et al. ................. 370/342
6,321,090 B1 * 11/2001 Soliman ...................... 455/436

* cited by examiner

*Primary Examiner*—Thanh Cong Le
(74) *Attorney, Agent, or Firm*—Haynes and Boone, LLP

(57) ABSTRACT

In a hierarchical network system, at least one comparatively small underlay cell is embedded within a comparatively large overlay cell for the purpose of increasing the network capacity of certain area inside the overlay cell. The underlay cell is configured within an overlay cell to have both a traffic carrier and a pilot beacon, or a "Lantern," carrier. The Lantern carrier, which comprises the Pilot, Paging and Sync channels, should be programmed to set its overhead power level to be lower than an overhead channel power level of the traffic carrier. Thus, the coverage or the footprint of the traffic carrier can always encompasses the footprint of the Lantern carrier. Hence, the quality of a traffic signal is always ensured when a mobile telecommunication unit (MU) is switched from the overlay cell to the underlay cell. When the MU is active, it will be switched to the underlay cell when it detects the Lantern carrier. When the MU is in an idle mode, a Global Service Redirection message in the Lantern carrier's paging channel directs the handoff to the traffic carrier. When the MU leaves the underlay cell, the wireless service is handed back to the overlay cell or other surrounding networks by going through steps directed by an Enhanced Hard Handoff (EHHO) protocol.

22 Claims, 1 Drawing Sheet

CDMA BASE STATION LANTERN APPLICATION

BACKGROUND OF THE INVENTION

The present invention relates generally to telecommunication network systems, and more particularly, to a system and method implementing hard handoff for hierarchical cell sites within a Code Division Multiple Access (CDMA) telecommunication network.

One major feature of CDMA technology that differentiates it from other wireless communication technologies is its reuse of specific frequencies. Although it enjoys a technical edge over other communication technologies such as Time Division Multiple Access (TDMA) in many aspects, CDMA technology encounters an undesirable "hot spot" problem. Since a comparatively large number of users may have to be serviced by one sector of a cell using a same frequency, such a heavily populated area makes up a "hot spot" in the cell whereas the network performance deteriorates. Therefore, to ameliorate the problem of "hot spots" in modern telecommunication network system design, a cost effective hierarchical cell structure (HCS) is often desirable for increasing radio frequency (RF) channel capacity in a given location. A HCS normally refers to a system of overlay and underlay cells networked together to provide seamless communication for a mobile telecommunication unit (MU). Moreover, an overlay cell fully encompasses a smaller, underlay cell. In addition, an underlay cell can be enclosed by multiple levels of overlay cells. As shown in FIG. 1, a CDMA HCS usually comprises of an overlay cell 10 and at least one underlay cell 12.

However, because of the frequency reuse feature of CDMA technology, simply installing an underlay cell using the same carrier frequency as an overlay cell does not effectively eliminate a "hot spot." A soft handoff to the underlay cell may help to strengthen the signal quality in the hot spot, but does not improve overall capacity. Therefore, a hot spot may remain because no significant increase of users can be permitted, even with a HCS design. Moreover, problems relating to soft handoff and outside interference from the overlay cell could further degrade the network performance. Accordingly, an underlay cell using a different carrier frequency is desired.

U.S. patent application entitled "Precision Hard Handoff Method Using Pilot Beacon Distributors," which is identified as U.S. application Ser. No. 09/365,262 and assigned to the same entity, deals with a scenario that a specific underlay cell having a distinctive carrier frequency is installed to serve an isolated campus which has a large population of wireless MUs. Groups of distributed antennas are deployed and installed at each entrance of the isolated campus whereby MUs entering and exiting the campus are switched to an appropriate frequency of the covering cell. One drawback, among others, of this invention is that at least two antennas must be installed at every entrance or exit.

A method is needed for a better CDMA network design for embedding a CDMA cell or cells in an overlay cell for providing additional coverage and capacity for low mobility traffic without being obstructed by various interferences and problems caused by soft handoffs.

SUMMARY OF THE INVENTION

A system and method to implement a hierarchical CDMA network design is provided wherein at least one comparatively small underlay cell is embedded within a comparatively large overlay cell for the purpose of providing services to a large number of wireless users within certain areas of the overlay cell.

One embodiment of the present invention is directed to configuring an underlay cell within an overlay cell with both a traffic carrier and a pilot beacon or a "Lantern" carrier. The Lantern carrier, which includes overhead channels such as Pilot, Paging and Sync, is programmed to set its overhead power level lower than the power level of the traffic carrier overhead channels so that the coverage or the footprint of the traffic carrier always encompasses the coverage of the Lantern carrier. Hence, the quality of a traffic signal is always assured when a mobile telecommunication unit (MU) is switched from the overlay cell to the underlay cell.

When an MU is active, i.e., it is engaging in a telephone call, and enters into the underlay cell, it will be switched to the underlay cell as soon as it detects a pilot on the Lantern carrier at a predetermined power level. Further, when the MU is in an idle mode, a Global Service Redirection message in the Lantern carrier's paging channel directs a hard handoff to the traffic carrier of the underlay cell. When the MU leaves the underlay cell, the wireless service is handed back to the overlay cell or surrounding networks by using protocols such as Enhanced Hard Handoff (EHHO). In case an underlay cell is located close to multiple surrounding or overlay cells, a particular overlay or cell can be designated as a target cell for the MU.

Various advantages are achieved according to the present invention. For example, one advantage is that very little hardware components need to be added to available telecommunication network equipments. For instance, although the Lantern and traffic carrier use their own Channel Element Module (CEM), they can share a common Digital Control Group (DCG). In addition, the two carriers may share a common antenna configuration.

DESCRIPTION OF THE PREFERRED EMBODIMENT

A few definitions are provided for the purpose of clarity. First, the relationship between cells are relative. A larger cell that encloses one or more smaller cells is an "overlay" cell to the smaller cells within, and the smaller cells are "underlay" cells to the larger cell. The underlay cells may further have different "levels" of underlay cells of their own. They may also have "peer" underlay cells, which do not have any coverage overlaps, under a same overlay cell. Therefore, a hierarchical cell structure (HCS) can have unlimited hierarchical levels of cells, and a particular cell can be an overlay cell to cells within its boundaries, while at the same time is itself an underlay cell to a larger overlay cell. Moreover, the telecommunication system is not required to store information of all the overlay cells and underlay cells of a particular cell. A cell needs only to be aware of its immediate overlay cell and its immediate underlay cell.

Figure 1:
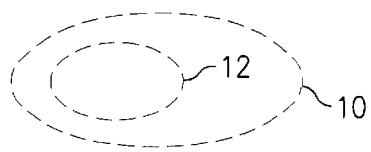
FIG. 1 illustrates a hierarchical structure of a telecommunication network having at least one underlay cell embedded in an overlay cell.
Figure 2:
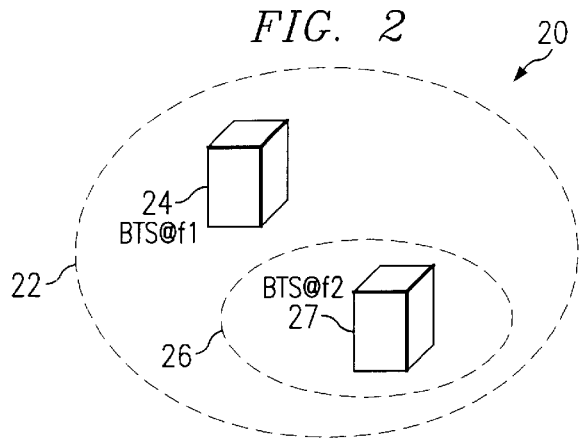
FIG. 2 illustrates an underlay cell embedded in an overlay cell having a different carrier for its traffic channel, and having a Lantern with a same carrier frequency as that of the overlay cell according to the present invention.

Referring now to FIG. 2, an overview of a CDMA HCS 20 is shown. An overlay cell 22 has a Base Transmission Station (BTS) 24 providing a carrier frequency (or simply "carrier") of f1. Inside the overlay cell 22, there are certain areas that are overly populated with mobile telecommunication units (MU). In such an area, the MUs compete for network resources and consequently suffer undesirable results such as call dropping or denied access to the wireless service. According to one embodiment of the present invention, such a "hot spot" can be patched up by installing an underlay cell 26 which exclusively serves this limited area to provide additional network capacity. This underlay cell has a different carrier, e.g., f2, for its traffic channel. Thus, the existence of this underlay cell does not detrimentally impact the capacity of the overlay cell. The hardware design is implemented by installing a CDMA BTS 27 in the underlay cell 26.

Figure 3:
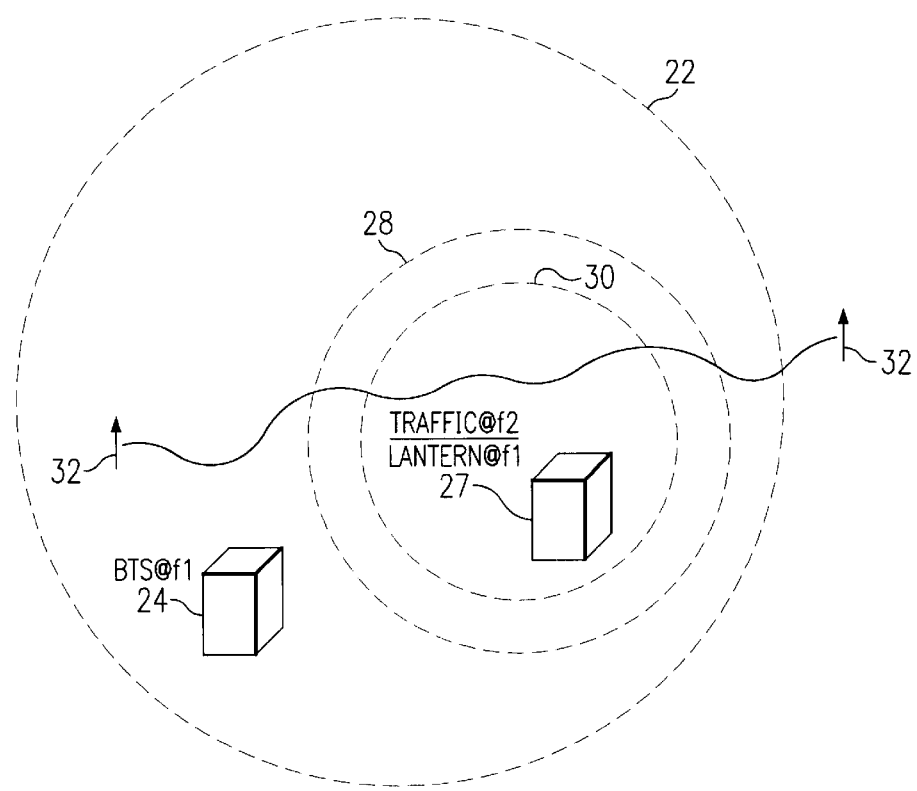
FIG. 3 shows detailed footprints of the traffic channel and the Lantern in the underlay cell of FIG. 2.

FIG. 3 is an expanded view of the CDMA HCS 20 as described above and shown in FIG. 2. The underlay cell 26 is embedded in the overlay cell 22, wherein the overlay cell has a carrier f1 and the underlay cell has a carrier f2 for their respective traffic channels. However, the underlay cell 26 also has a pilot beacon or "Lantern" transmitted on carrier f1. Moreover, the power level of the traffic channel carrier, which is on carrier f2, is configured to be stronger than the power level of the overhead channels, i.e., the Pilot, Paging and Sync channels of f1. Effectively, the footprint of the traffic channel is larger than that of the Lantern. In FIG. 3, the underlay cell 26 is shown as two circular areas, the outer circle 28 graphically represents the footprint of the traffic channel on carrier f2, and the inner circle 30 delineates the footprint of the Lantern on carrier f1.

When an active MU 32 enters the boundary of the overlay cell and the underlay cell, it first crosses the boundary line of the traffic channel on carrier f2. Since the MU 32 is currently operating on carrier f1, which is different from carrier f2, when it steps into the territory of carrier f2, the wireless service provided to the MU 32 on carrier f1 is not interfered by carrier f2. When the MU 32 moves further into the footprint of the Lantern so that the Lantern is detected by the MU 32 at a predetermined power level, a hard handoff to carrier f2 is triggered or forced. When the MU 32 leaves the underlay cell, the traffic channel will be handed over again to carrier f1 if threshold values of certain parameters of Enhanced Hard Handoff (EHHO) protocol, such as Frame Error Ratio, Traffic Channel Gain and Signal-to-Noise Ratio are surpassed. Detailed description of using EHHO is found in U.S. patent application Ser. No. 08/769,650, which is also assigned to the same entity.

If an underlay cell is located close to the boundary line of the overlay cell or in a location where footprints of multiple BTSs overlap among them, then a Multi-Pilot Hard Handoff (MPHHO) can be used to assist the transition from carrier f2 back to f1. In one embodiment, the MPHHO is a hard handoff technique using Round Trip Delay (RTD) as the primary triggering mechanism. The Round Trip Delay technology is explained in U.S. application Ser. No. 08/858,593, which is assigned to the common assignee. The MPHHO ensures that a best possible candidate among multiple target cells is selected to guarantee call quality.

When the MU 32 is powered on but idle, i.e., no active conversation is being conducted, an idle hard handoff mechanism must take place from the overlay cell to the underlay cell. It is known in the art that the idle MU 32 always recognizes one BTS as its home base, even though it does not use the home base BTS to service any active conversation at that moment. A pilot signal of this home base BTS is closely monitored and compared with pilot signals received by the MU 32 from other BTSs in its neighbor list. The MU 32 may constantly search for a new pilot signal that has the strongest power level. Hence, in order to steer a transition from the overlay cell to the underlay cell, a Global Service Redirection (GSR) parameter is enabled in the Paging channel of the Lantern. The GSR setting, if read by the MU 32, can force a hard handoff to a particular carrier frequency. When the MU 32 perceives the existence of a stronger BTS 27 of the underlay, under the guidance of the GSR setting, a hard handoff is thus triggered from carrier f1 to carrier f2. When the MU 32 leaves the underlay cell, the MU 32 automatically switches to a stronger carrier, in this case, carrier f1 due to the reduction of the signal strength of carrier f2.

For hardware implementation of the network configuration as set forth above, the underlay cell requires two Flexible Radio Modules, each configured for a different carrier, i.e., f1 and f2. The PilotDataBase parameter of the Lantern carrier f1 will be datafilled with a CellType of CELL_PILOT_BEACON so that any MU entering into the coverage area of the underlay cell can detect the Lantern. The same parameter for traffic carrier f2 is datafilled with a CellType of CELL_STANDARD. Each carrier thus needs its own Channel Element Module (CEM), but both carriers can share the same Digital Control Group (DCG). In one embodiment of the present invention, both carriers can even share a common antenna setup so that the footprint of the Lantern can closely track that of the traffic channel of the underlay cell.

The above described embodiments of the present invention perform well in an indoor space where the MUs have comparative low mobility. For instance, an underlay cell can provide services essentially to all the MUs inside a building while an overlay cell is the primary cell covering all areas around the building. If a system so requires, multiple underlay cells can be implemented for various "hot spots" in an overlay cell.

Various advantages have been achieved by the present invention. Most obviously, the present invention avoids unnecessary cell splitting by simply installing an underlay cell to relieve traffic loads of specific user intensive areas.

Further, for system growth planning purpose, using underlay cells can delay expensive replanning of an entire CDMA network system. For a far smaller cost to a system operator than redesigning the entire system, the present invention deals with the "hot spot" problem and at the same time satisfies the users for their communication needs.

It should also be noted that the concept of having a Lantern to induce a hard handoff can also be used in a multiple sector environment as long as an underlay cell placed in each sector has both a pilot beacon and a traffic channel operating on different carrier frequencies.

The above disclosure provides many different embodiments, or examples, for implementing different features of the invention. Also, specific examples of components, and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for a mobile unit to switch between an overlay cell and at least one underlay cell, said overlay cell and underlay cell being serviced by Code Division Multiple Access technology, said overlay cell encompassing said underlay cell, said overlay cell having a first carrier frequency, and said underlay cell having a second carrier frequency, said method comprising the steps of:
    configuring a pilot channel of the underlay cell to have a carrier frequency of the first carrier frequency;
    providing a pilot signal to the mobile unit when the mobile unit enters the underlay cell from the overlay cell; and
    triggering a hard handoff of the mobile unit from the overlay cell to the underlay cell by the pilot signal while the mobile unit enters the underlay cell.

2. The method of claim 1 wherein the step of configuring controls the underlay cell in that a coverage area of the pilot channel is smaller than a coverage area of a traffic channel of the underlay cell.

3. The method of claim 1 wherein the step of configuring further includes adding a Flexible Radio Module and a Channel Element Module to a base transmission station of the underlay cell for the pilot channel.

4. The method of claim 1 further includes a step of triggering a hard handoff of the mobile unit from the underlay cell to the overlay cell if it is active and if at least one parameter of an Enhanced Hard Handoff (EHHO) protocol satisfies a predetermined threshold value.

5. The method of claim 4 wherein the at least one parameter of EHHO is Frame Error Ratio, Traffic Channel Gain or Signal-to-Noise Ratio.

6. The method of claim 1 wherein the step of triggering, if the mobile unit is idle, further includes the steps of:
    enabling a predetermined Global Service Redirection parameter in a paging channel; and
    instructing the mobile unit to start a hard handoff to the underlay cell under the direction of the enabled parameter.

7. The method of claim 6 further includes a step of triggering a hard handoff from the underlay cell to the overlay cell when the signal strength of the second carrier frequency is significantly lower than that of the first carrier frequency.

8. A method for a mobile unit to switch between an outdoor cell and at least one indoor cell, said outdoor cell and indoor cell using Code Division Multiple Access technology, said indoor cell servicing the mobile unit inside a building structure and said outdoor cell servicing the mobile unit around the building structure, said outdoor cell having a first carrier frequency, and said indoor cell having a second carrier frequency, said method comprising the steps of:
    configuring a pilot channel of the indoor cell to have a carrier frequency of the first carrier frequency;
    providing a pilot signal to the mobile unit when the mobile unit enters the indoor cell from the outdoor cell;
    enabling a predetermined Global Service Redirection (GSR) parameter in a paging channel;
    triggering a hard handoff of the mobile unit from the outdoor cell to the indoor cell by the pilot signal;
    triggering a hard handoff of the mobile unit, if it is active, from the indoor cell to the outdoor cell if at least one parameter of Enhanced Hard Handoff (EHHO) protocol satisfies a predetermined threshold value; and
    triggering a hard handoff of the mobile unit, if it is idle, from the indoor cell to the outdoor cell when the signal strength of the second carrier frequency is significantly lower than that of the first carrier frequency.

9. The method of claim 8 wherein the step of configuring configures the coverage area of a traffic channel of the indoor cell to be slightly bigger than the boundary of the building.

10. The method of claim 8 wherein the step of configuring further configures the boundary of the pilot channel of the indoor cell to coincide with the boundary of the building.

11. The method of claim 8 wherein the step of configuring further includes adding a Flexible Radio Module and a Channel Element Module to a base transmission station of the indoor cell for the pilot channel.

12. The method of claim 8 wherein the at least one parameter of EHHO is Frame Error Ratio, Traffic Channel Gain or Signal-to-Noise Ratio.

13. The method of claim 8 wherein the step of triggering a hard handoff of the mobile unit from the outdoor cell to the indoor cell by the pilot signal further includes the steps of:
    instructing the mobile unit, when the mobile unit is idle, to start the hard handoff to the indoor cell according to the enabled GSR parameter; and
    triggering the hard handoff from the indoor cell to the outdoor cell when the signal strength of the second carrier frequency is significantly lower than that of the first carrier frequency.

14. A system for a mobile unit to switch between an overlay cell and at least one underlay cell, said overlay cell and underlay cell being serviced by Code Division Multiple Access technology, said overlay cell encompassing said underlay cell, said overlay cell having a first carrier frequency, and said underlay cell having a second carrier frequency, said system comprising:
    a base transmission station serving the underlay cell configured to have a pilot channel with a carrier frequency of the first carrier frequency; and
    means for providing a pilot signal to the mobile unit on the pilot channel to trigger a handoff between the underlay cell and the overlay cell when the mobile unit enters the underlay cell.

15. The system of claim 14 further includes a means for triggering a hard handoff of the mobile unit, when it is active, from the underlay cell to the overlay cell if at least one parameter of Enhanced Hard Handoff protocol satisfies a predetermined threshold value.

16. The system of claim 14 wherein the at least one parameter of EHHO is Frame Error Ratio, Traffic Channel Gain or Signal-to-Noise Ratio.

17. The system of claim 14 wherein the base station is configured to have a coverage area of the pilot channel of the underlay cell to be smaller than a coverage area of a traffic channel.

18. The system of claim 17 wherein an antenna is used both for transmission of the pilot channel and the traffic channel.

19. The system of claim 14 wherein the base transmission station has a Flexible Radio Module and a Channel Element Module for each carrier frequency while having a shared Digital Control Group.

20. The system of claim 14 further includes:

means for encoding a pre-enabled Global Service Redirection parameter in a paging channel directing the hard handoff of an idle mobile unit to the underlay cell when the mobile enters the underlay cell; and means for triggering a hard handoff to the overlay cell based on a threshold signal strength value when the mobile unit leaves the underlay cell.

21. The system of claim 14 wherein the mobile unit has a low mobility.

22. The system of claim 14 further includes a means for directing a hard handoff to a predetermined overlay cell when the mobile unit leaves the underlay cell by using a Multi-Pilot Hard Handoff protocol.

* * * * *